(12) United States Patent
Reik et al.

(10) Patent No.: US 6,270,436 B1
(45) Date of Patent: Aug. 7, 2001

(54) CONTINUOUSLY VARIABLE TRANSMISSION

(75) Inventors: Wolfgang Reik, Bühl; Ruben Schmitt, Heidelberg; Wolfgang Haas, Bühl; Friedrich Gerhardt, Kehl-Lutesheim, all of (DE)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/409,004

(22) Filed: Sep. 29, 1999

(30) Foreign Application Priority Data

Oct. 2, 1998 (DE) ............................................. 198 45 431

(51) Int. Cl.⁷ .................................................. F16H 55/56
(52) U.S. Cl. .................................................. 474/8; 474/15
(58) Field of Search .................................. 474/8, 12, 13, 474/14, 15, 38

(56) References Cited

U.S. PATENT DOCUMENTS 4,432,743 * 2/1984 Pitoiset ................................... 474/14
5,108,347 * 4/1992 Gourdon ................................ 474/13
6,186,915 * 2/2001 Dietl ...................................... 474/8

FOREIGN PATENT DOCUMENTS

| 35 31 830 A 1 | 4/1986 | (DE) . |
| 1-224557 * | 9/1989 | (JP) . |
| 1-312256 * | 12/1989 | (JP) . |

* cited by examiner

*Primary Examiner*—David Fenstermacher
(74) *Attorney, Agent, or Firm*—Darby & Darby (57) ABSTRACT

A continuously variable drive mechanism has
- a variator with two conical disks, at least one of the conical disks being axially movable,
- a belt running at a variable running radius axially between the conical disks, and
- a disk-tightening device pushing the axially movable conical disk against the other of the two conical disks, thereby applying axial pressure to the flexible torque-transmitting device.

The disk-tightening device works with guiding means converting a rotational displacement into an axial displacement.

65 Claims, 6 Drawing Sheets

CONTINUOUSLY VARIABLE TRANSMISSION

BACKGROUND OF THE INVENTION

The invention relates to a continuously variable belt-drive mechanism, particularly for motor vehicles, with at least one variator. The term "variator" as used herein means a pulley comprised of at least two conical disks arranged concentrically on a driving shaft of a prime mover unit or on an element that is connected to the driving shaft. At least one of the conical disks is axially movable, and an endless flexible torque-transmitting device (subsequently referred to as a belt) occupies the axial space between the conical disks at a location of variable radius. A disk-tightening device pushes the conical disks axially towards each other so that, by virtue of the frictional engagement between the conical disks and the belt, the latter receives the torque to be transmitted and passes it on to at least one pulley disk.

Continuously variable belt-drive mechanisms of this kind are used in particular in motor vehicles as continuously variable transmissions and as drivers of auxiliary devices. In transmitting torque from the variator to other pulley disks, the critical factor is the frictional engagement between the belt and the conical disks. The disk-tightening devices used to produce the frictional engagement are in many cases energy-storing elements, such as helix springs, pushing against the axially movable conical disks. However, with an arrangement of this kind, the contact pressure between the belt and the conical disks is independent of the amount of torque that is to be transmitted.

Also known are variators with disk-tightening devices in which the amount of contact pressure depends on a centrifugal force, i.e., increases at greater rpm speeds, whereby the contact pressure is only coarsely adapted to the amount of torque that is to be transmitted.

In DE-OS 35531830, a disk-tightening device is proposed where the conical disks are pushed against a belt by a torque-dependent force. The conical disks are moved by pull rods with pivotal connections at both ends that are expensive to manufacture. Besides the cost factor, the proposed disk-tightening device also requires a great amount of space in the axial dimension.

OBJECT OF THE INVENTION

Therefore, the object of the present invention is to provide a continuously variable belt-drive mechanism that can be accommodated within a reduced amount of axial space and is more cost-effective to manufacture.

SUMMARY OF THE INVENTION

The object of the invention is met by a continuously variable belt-drive mechanism comprising at least one variator with at least two conical disks arranged concentrically on a driving shaft of a prime mover unit or on an element that is connected to the driving shaft. At least one of the conical disks is axially movable, and an endless flexible torque-transmitting device (subsequently called a belt) occupies the axial space between the conical disks at a location of variable radius. A disk-tightening device pushes the conical disks axially towards each other so that, by virtue of the frictional engagement between the conical disks and the belt, the latter receives the torque to be transmitted and passes it on to at least one pulley disk. The disk-tightening device consists at least of an arrangement of mutually complementary guiding means connected, respectively, to the axially moveable conical disk and to an element that is axially fixed on the driving shaft. Dependent on the magnitude of the torque to be transmitted and/or dependent on a transmission ratio that is externally settable, the guiding means are effecting an axial displacement of the conical disk that occurs as a result of a rotational displacement that the guiding means perform in relation to each other.

A continuously variable belt-drive mechanism of this kind can be employed, e.g., to drive auxiliary devices in an arrangement where at least one auxiliary device is driven by the torque-transmitting engagement of a pulley with the belt. Normally, several auxiliary devices such as, e.g., an alternator, a power-steering pump, an air-conditioning compressor, a water pump, and/or similar units can work on one belt drive. The diameter of each driven pulley determines a base value of the transmission ratio to the variator. In addition, by varying the radius at which the belt passes over the variator, the transmission ratio can be varied within a range of 2:1 to 4:1 (between the largest and smallest possible ratio) if the diameter of the conical disks is 150 to 300 mm. Particularly preferred is a diameter of 180 to 220 mm, resulting in a range of transmission ratios of 2.5:1 to 3:1.

The continuously variable belt-drive mechanism can also be used in the drive train of a prime mover unit, e.g., an internal-combustion engine, with at least one variator arranged on the driving shaft and, preferably, a second variator on the driven shaft, so that the two variators together constitute a continuously variable transmission. The variators are controlled in such a manner that the radii at which the belt engages each of the variators are complementary to each other. A torque-transmitting unit such as a friction clutch or laminar-disk clutch, a fluid coupling, or a hydrokinetic torque converter can be arranged in the torque-flow path between the prime mover unit and the driving variator. By using two variators, the numerical value for the range of transmission ratios will be squared.

One embodiment according to the invention can be provided with a disk-tightening device comprising at least three axially rising spiral ramps that are evenly distributed on the at least one axially movable cone disk and on a component that is axially fixed on the driving shaft. The respective ramps on the axially movable cone disk and on the axially fixed component are rotatable in relation to each other.

A disk-tightening device can also consist of spiraling grooves that are evenly distributed in the at least one axially movable cone disk with a complementary arrangement of grooves in a hub that is fixed on the driving shaft and with roller elements being guided in the grooves.

To simplify mounting on the driving shaft, the variator can have a hub on which the conical disks are seated. The hub has a flange-like extension by which the variator is centered on the driving shaft and, e.g., axially bolted to the latter in a rotationally fixed connection.

It is advantageous if the axial space between the conical disks where the belt is seated is V-shaped, i.e., widening in the outward radial direction. The belt has corresponding sloping flanks so that, by applying a force generated, e.g., by an adjustable belt-tensioning device, the belt can be moved to a smaller running radius, whereby the transmission ratio is changed. A move to a greater radius can be effected by reducing the tensioning force. It can also be advantageous, e.g., in a continuously variable transmission, if the transmission ratio is set through the contact pressure of the disk-tightening device, increasing the contact pressure in one variator and decreasing it in the other, whereby the running radius of the belt is increased in one variator and decreased in the other and the transmission ratio is changed accordingly. It is advantageous if the aperture angle a of the individual conical disks (i.e., the angle between the conical surface and a plane perpendicular to the axis of rotation) is in a range of $5°<\alpha<20°$, the preferred value being $\alpha\approx20°$. It can be particularly advantageous if the running surfaces do not have a linear profile in the radial direction but are slightly inward-curved to optimize the relationship of the contact force as a function of the radius.

According to the invention, the at least one axially movable conical disk has axially rising ramps arranged on the side facing away from the space that holds the belt. The ramps bear against complementary ramps arranged on an element that is fixed on the driving shaft. It is advantageous if the element carrying the complementary ramps is a radially projecting hub flange that is axially fixed and non-rotatable on the hub. The ramps are equally distributed along a circumference and rotatable in relation to each other so that the two parts carrying the ramps will change their axial distance when they are rotated against each other, whereby the contact pressure on the belt is increased or decreased. This axial movement, which follows the relative rotation between the conical disk and the hub flange, is a function of the driving torque present in the driving shaft and of the opposing torque load of the auxiliary devices.

Depending on the application, it can further be advantageous if either both or only one of the conical disks are axially movable. The inventive concept provides for a chamber to receive the disk-tightening device with ramps and the hub flange. The chamber can be formed by the radially projecting conical disk flange, another flange at an axial distance, and a tubular connection along the outside circumference. It is advantageous if the tubular connection is formed integrally of one piece together with the conical disk and if the other flange is screwed, riveted, or welded to the tubular connection. The chamber formed in this manner protects the disk-tightening device against dirt and/or it can be at least partially filled with a lubricant to lubricate the ramps, thereby reducing friction wear. It is advantageous if the hub flange, which separates the chamber into two compartments, has one or preferably several openings distributed over a circumference to allow the exchange of lubricant from one compartment to the other. At the axial end of the hub, the chamber can have an opening at its center to allow the variator to be mounted on the driving shaft. The opening may be covered with a cap for protection against dirt and/or as a seal against lubricant loss. At its outside perimeter, the hub flange can be held centered and at the same time be axially movable and rotatable in relation to the chamber (and thus in relation to the conical disk) by means of an interposed slide bushing.

To reverse the axial displacement when the torque decreases and also to provide a base amount of contact pressure, there can be two energy-storing elements working in the axial direction between the conical disk and the hub flange. The energy-storing devices can be, e.g., plate springs or compressive helix springs with an either linear or non-linear characteristic. It can be advantageous to use, e.g., springs with a progressive characteristic and/or compressive helix springs with windings configured to work like a plate spring in order to minimize the spatial requirements (particularly in the axial dimension) of the variator. This kind of force application on the conical disks provides a torque-independent minimum amount of contact pressure and will thus assure a minimum amount of tension in the belt.

In accordance with the inventive concept, the ramps that are distributed over a circumference can be configured as a ramp ring of metal or hardened metal that is attached to or stamped on the hub flange and/or to one or both of the conical disks. In simple versions, the ramp ring can consist of a polymer so that no lubrication is needed between the mutually complementary ramp rings of each conical disk and the respective hub flange. It is advantageous if the two complementary ramp rings are located in the inner two-thirds of the conical disk diameter, preferably in the midrange of the radius of the conical disk. This arrangement of the ramps allows the conical disk to rest against the hub flange, whereby tilting and tumbling movements of the conical disk are minimized. The radial and axial supporting functions for the axially movable conical disk are thus kept separate, with the radial seat being provided at the outer or inner circumference of the conical disk and the axial seat being provided by the disk-tightening device at the hub flange.

To minimize friction of the ramp surfaces on each other, it is possible to apply a friction-reducing layer, e.g., of a polymer or ceramic material, and/or interposed ball-shaped or conical roller elements. However, this will increase the cost of the disk-tightening device. It is advantageous if the roller elements, particularly ball-shaped roller elements, are held in ring-shaped cages with compartments corresponding to the number and shape of roller elements, where the latter are constrained axially and/or radially. The roller element cage can be attached to the hub flange or the conical disk, e.g., by connecting the cage to a holder ring, or a holder ring can be provided as an integral part of the roller element cage. By means of tongue-like projections that are distributed along its circumference, the holder ring can be installed non-rotatably and securely in corresponding openings of the hub flange or the conical disk.

The secure installation of the roller element cage and thus of the roller elements themselves can be of particular advantage if the ramps are not rising at a linear rate along the circumference (which is the simplest ramp shape) but, e.g., at an exponential rate to provide an optimized contact pressure for the amount of torque to be transmitted. With the exponentially rising ramps, it is possible for individual roller elements to get dislocated in the circumferential and radial direction. The roller elements can additionally be held and constrained in the circumferential direction by providing the roller element cages with pinion gears that roll on toothed profiles of the conical disk and/or hub flange.

The disk-tightening device can be arranged at one of the conical disks or at both conical disks, in which case each of the respective conical disks is axially movable and rotatable on the hub, possibly with a slide bushing being interposed (which may at the same time provide a seat for the energy-storing device). It can also be advantageous to seat the conical disks non-rotatably on two hub elements that are supported by the main hub, rotatable and axially movable in relation to each other each other, where one of the hub elements can slide at least partially over the other.

In the case where two axially movable conical disks are used, each of them can rest axially against a hub flange through the mutually complementary ramp rings in an arrangement where two hub flanges are solidly connected to the hub and the two conical disks are accommodated between the hub flanges. However, it can also be advantageous to use only one hub flange with ramp rings on both sides (i.e., facing in both axial directions) where one conical disk and its ramp ring constitute one of the disk-tightening devices. The other conical disk is solidly connected (i.e., rotationally and axially fixed) to an auxiliary disk extending radially on the opposite side of the hub flange and also carrying a ramp ring. The auxiliary disk constitutes the second disk-tightening device in an arrangement where both of the disk-tightening devices are located axially to one side of the conical disks. With the latter configuration, the plane of the belt-drive loop can be located away from the prime mover unit, and the disk-tightening devices can be arranged axially in between so that axially projecting elements of the prime mover unit can be accommodated without taking up additional axial space. Alternatively, if the space available for the prime mover unit is limited, the belt drive can be close to the prime mover unit so that the only additional space needed along the driving shaft is to accommodate the disk-tightening devices next to the conical disks on the opposite side from the prime mover unit. In this embodiment, the conical disk can be connected to the auxiliary flange by means of a tubular connecting element between the conical disk and the auxiliary flange. The tubular connecting element is seated directly on the hub and has openings arranged on its circumference. The hub flange is solidly connected to the hub by means of radially inward-directed projections that pass through the openings of the tubular connecting element. The openings are appropriately dimensioned to leave a sufficient amount of play for the axial displacement of the conical disk that is connected to the auxiliary flange and also for the rotational displacement of the hub flange against the conical disk. As described previously, the rotational displacement, by means of the ramps, produces the axial displacement of the conical disk in relation to the hub flange.

In accordance with another concept of the invention, it can be of great advantage to integrate an absorber for rotational vibrations into the variator, if this can be accomplished without significantly expanding the spatial envelope. A practical arrangement comprises at least one energy-storing device acting in a circumferential direction against an element that is solidly connected to the hub, preferably against the hub flange, which for this purpose is provided with radial projections. The energy-storing device is advantageously configured in the form of helix-shaped compression springs that are accommodated between the projections. As a vibration absorber mass, there can be mass rings provided in the area of the outer circumference of the hub flange. The mass rings have corresponding openings that the energy-storing devices bear against. To stabilize the absorber mass, the mass rings can be provided with connectors such as rivets, screws or the like that pass through openings in the hub flange. The play of the connectors within the openings corresponds to the range of rotational displacement between the mass rings and the hub.

In accordance with the invention, when the belt is used to power the at least one auxiliary device, the transmission ratio is set by adjusting the effective length of the belt, i.e., by tightening the belt with a belt-tensioning device so that the belt is pulled in the direction of a smaller running radius between the conical disks against the contact pressure produced by the disk-tightening device. When the tension in the belt is relaxed, the latter will be pushed radially outwards by the axially directed contact pressure because the conical contours of the belt and the conical disks produce an outward-directed force component towards a greater running radius whereby the transmission ratio is increased, i.e., the auxiliary devices are driven at a higher RPM speed.

To control the effective length of the belt through the tensioning device, the belt can be arranged to run over a tensioning pulley that can be moved radially along the diameter of the belt disks or of the belt, which is effectively the same as enlarging or reducing the diameter. It can also be advantageous to use a duplex pulley with two direction-changing guide pulleys mounted on different, spaced-apart axes in the same holder. As the belt runs between the pulleys and the holder is rotatable about an axis running parallel between the pulley axles, the thus rotatable holder becomes a tensioning device that can be advantageous for adjusting the transmission ratio of the belt-drive mechanism.

It is advantageous if the tension produced by the tensioning devices can be varied by means of an electric motor. For example, the tensioning pulley can be moved electrically on a linear displacement path or the duplex pulley can be rotated electrically. The electric motor can be self-holding, and it is advantageous if the control of the motor is dependent on a system parameter. The system parameter can be based on the RPM speed of the driving shaft and/or the RPM speed of at least one element that is driven by the belt drive or an electrical signal of the alternator. It is advantageous to use RPM transducers to register the RPM speed of at least one of the pulleys in the belt drive that contribute to the system parameter.

According to a further concept of the invention, the function of the belt can be divided into a transmission function and a driving function. For this purpose, the belt can be divided into a transmission belt and a drive belt. Along a common path segment, one belt can roll on top of the other whereby the torque is transmitted from the driving shaft to the drive pulleys of the auxiliary devices through a form-fitting or frictional engagement between the belts. In a preferred configuration, in addition to having a V-shaped cross-section conforming to the conical disks, the transmission belt also has a multitude of V-shaped lengthwise grooves running along its outside that engage in frictional contact with corresponding grooves of the drive belt. The drive belt with the multiple V-grooves drives the driving pulleys of the auxiliary devices. It can be advantageous if the drive belt has multiple V-grooves on both sides, which would allow auxiliary devices to be driven in the reverse direction of the driving shaft without requiring a direction-changing guide pulley.

The length adjustment of the transmission belt for different transmission ratios can be made with a tensioning device as described above. It is further possible to provide a transmission belt that corresponds approximately to the circumference of the conical disks so that at the biggest ratio the transmission belt runs approximately in the space between the conical disks, while at smaller ratios the transmission belt is pulled out of the circumference of the conical disks by the drive belt, in which case the tensioning device is arranged in the loop of the drive belt. To prevent the transmission belt from escaping sideways and from running unevenly outside of the space between the conical disks, the transmission belt can be constrained by guide pulleys or by appropriately configured driving pulleys of auxiliary devices that are arranged in this portion of space.

The novel features that are considered as characteristic of the invention are set forth in particular in the appended claims. The improved apparatus itself, however, both in its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

The invention is explained below with details referenced against the attached drawing, in which.

DETAILED DESCRIPTION OF THE INVENTION

Figure 1:
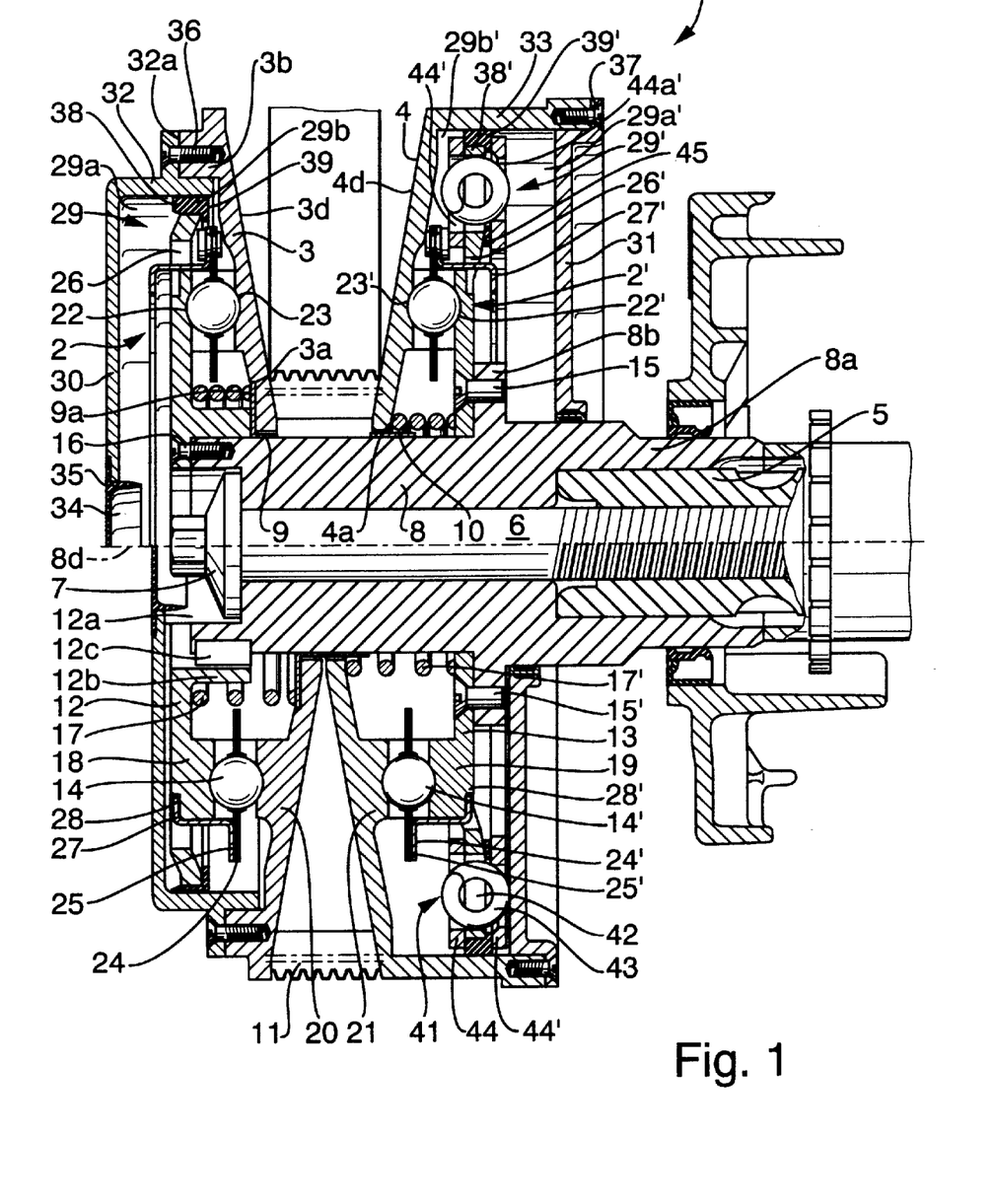
FIG. 1 represents an embodiment of a variator according to the invention with two disk-tightening devices shown in a lengthwise section.

FIG. 1 represents a variator 1 with two disk-tightening devices 2, 2' and two axially movable conical disks 3, 4. The upper half of the drawing shows the variator in a state corresponding to a small transmission ratio, while the lower half corresponds to a large transmission ratio.

The variator 1 is non-rotatably connected to a hub 8 that is mounted on the driving shaft 5. The hub 8 has a central opening 6 traversed by a fastening screw 7 to attach the hub 8 to the driving shaft 5. The conical disks 3, 4 are axially movable and rotatable on the hub, seated on interposed slide bushings 9, 10 with radial projections 9a, 10a resting against shoulders 3a, 4a in the lateral surfaces of the conical disks 3, 4. A wide V-belt 11 runs around the conical disks 3, 4, held in frictional engagement by the necessary amount of contact pressure between the conical disks 3, 4, and drives the driven pulleys (not shown) of the belt-drive mechanism. The belt 11 has a V-shaped cross section conforming to the aperture between the conical disks 3, 4. Preferably, each conical disk surface 3d, 4d encloses an angle of 10° with the direction perpendicular to the hub.

The conical disks 3, 4, through interposed roller bodies 14, 14', rest axially against two hub flanges 12, 13. The hub flange 13, by means of circumferentially distributed screws 15 and/or bolts 15', is axially and rotationally fixed on the radially projecting flange-like part 8b that is formed as an integral portion of flange 8. The hub flange 12, by means of circumferentially distributed screws 16, is axially and rotationally fixed on the end surface of the hub 8, leaving an opening 12a for the installation of the screw 7. A key-seat connection 12c allows the hub flange to be positioned on the hub 8. The hub flange 12 is centered on the hub 8 by means of an axial extension 12b which further helps to keep the flange 12 in perpendicular alignment on the hub 8.

Helical compression springs 17, 17' are arranged axially between the conical disks 3, 4 and hub flanges 12, 13, respectively. The helical compression springs 17, 17' work as energy-storing elements in the axial direction and are configured, e.g., with portions of different diameter or different wire thickness, and or with differently shaped (e.g., progressive) windings, to achieve special spring characteristics meeting different requirements. Resting against the hub flanges 12, 13, the helical compression springs 17, 17', by way of the interposed radially projecting bushing portions 9a, 10a, apply a torque-independent compressive force against the conical disks 3, 4, thereby generating the contact pressure that the conical disks 3, 4 exert on the belt 11.

The torque-dependent disk-tightening devices 2, 2' are provided in the form of ramps 18, 19 rising axially along a circumference of the hub flanges 12, 13 and ramps 20, 21 of complementary configuration on the conical disks 3, 4. Roller elements 14, 14' running in grooves 22, 22', 23, 23' serve the purpose of reducing friction. The roller elements are secured in roller element cages 24, 24' that are attached to the hub flanges 12, 13 by means of holder rings 25, 25'. The holder rings 25, 25' are riveted to the outside circumference of the roller element cages 24, 24' and have tongue-like projections 27, 27' distributed along their respective perimeters. The tongue-like projections 27, 27' extend at first radially from the holder rings 25, 25', then run in the axial direction through openings 26, 26' in the respective hub flanges 12, 13 and reach around the latter to engage recesses 28, 28' of the hub flanges 12, 13.

The disk-tightening devices 2, 2' are accommodated inside of chambers 29, 29' that are movable together with the conical disks 3, 4. Each of the chambers 29, 29' is divided into two portions 29a, 29b and 29a', 29b', respectively. The two chamber portions have different volumes in relation to each other, depending on the position of the ramps 18, 19, 20, 21. Along their radially inward circumference, the chambers 29, 29' are delimited along their radially inward circumference by the hub 8, along the sides nearest to the belt 11 by the conical disks 3, 4, and along the opposite side by the radially oriented end flanges 30, 31. The end flange 31, which faces towards the driving shaft, has a rotatable and axially movable seat on the hub 8, sealed by means of a seal 31a. The opposite end flange 30 has a central opening 34 for the screw 7 which can be closed with a protective cap 35. The ring wall 32 at the outside circumference of the chamber 29 is formed as an axial projection of the end flange 30, centered inside an axial projection 3b of the conical disk 3 and attached to the latter by means of a radial projection 32a with circumferentially distributed screws 36. The ring wall 33 at the outside circumference of the chamber 29' is formed as an axial extension of the conical disk 4 that is attached to the end flange 31 by means of circumferentially distributed screws 37. The hub flanges have external toothed profiles 38, 38' in form-fitting engagement with internal toothed profiles of bearing rings 39, 39' that are accommodated radially inside of the ring walls 32, 33.

The chambers 29, 29' are at least partially filled with a suitable lubricant to lubricate the disk-tightening devices 2, 2'. The hub flanges 12, 13 have circumferentially distributed openings (not shown) to allow the exchange of lubricant inside the chambers 29, 29' during an axial displacement of the conical disks 3, 4.

A vibration absorber 41 for rotational vibrations is arranged in the area of the outside circumference of the hub flange 13. The vibration absorber comprises a rim of radial projections 42 distributed along the outside circumference of the hub flange 13, energy-storing devices 43, mass rings 44, 44' adjoining the hub flange 13 on both sides, and a friction disk 45 layered between the mass ring 44' and the hub flange 13. The projections 42 are spaced apart along the circumference so that each space can hold an energy-storing device 43, preferably a helical compression spring, bearing against the projections 42 at both ends. For certain applications it may also be advantageous to use a rubber element as an absorber unit. The mass rings 44, 44' have openings 44a, 44a' corresponding to the dimensions of the energy-storing devices 43 so that the latter also bear against the mass rings. The inertia of the mass rings 44, opposing the spring force of the energy-storing devices 43 and the friction force of the friction disk 45, absorbs rotational vibrations that reach the driving shaft 5 through the hub flange 13.

The torque-dependent adjustment of the contact pressure at a fixed, preset transmission ratio works as follows: When the driving shaft first begins to turn, only a torque-independent amount of contact pressure is available from the energy-storing devices 17, 17' and, because of the mass inertia of the auxiliary devices, the belt 11 slips. The reactive torque generated by the auxiliary devices and transmitted to the conical disks 3, 4 through friction causes a rotational displacement of the conical disks 3, 4 in relation to the hub flanges 12, 13. The rotational displacement along the axially rising ramps 18, 19, 20, 21 pushes the conical disks 3, 4 axially towards the belt 11, thereby increasing the contact pressure between the conical disks 3, 4 and the belt 11 until the amount of friction is sufficient to drive the auxiliary devices with almost no slippage of the belt. When the reactive torque of the auxiliary devices decreases, the axial force between the belt 11 and the disks 3, 4 will move the latter along the ramps 18, 19, 20, 21 until the contact pressure corresponds to the actual amount of friction required for the belt to drive the auxiliary devices.

To change the transmission ratio to a slower drive speed, a tensile force is applied to the belt 11 by means of a tensioning device. The tensile force needs to be sufficient to overcome the compressive force that the disk-tightening devices 2, 2' apply to the belt 11. The transmission ratio is changed to a faster drive speed by relaxing the tensile force on the belt 11.

Figure 2:
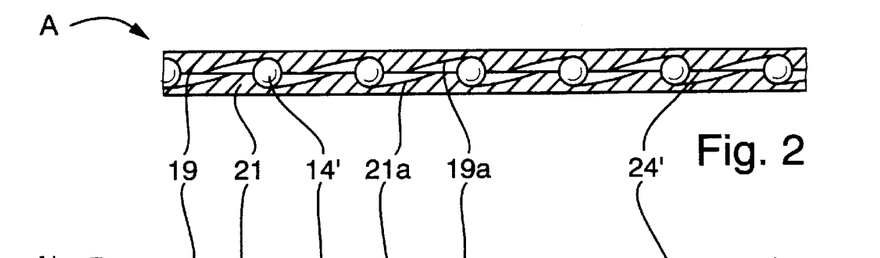
FIG. 2 represents a pair of mutually complementary ramp rings in a condition of minimal axial displacement.
Figure 3:
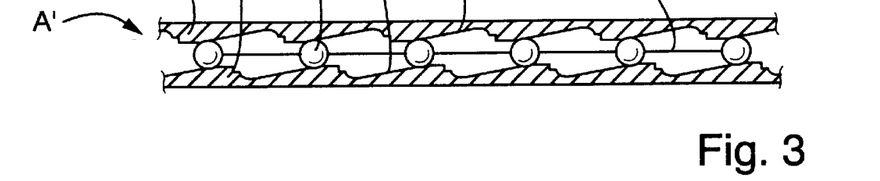
FIG. 3 represents a pair of mutually complementary ramp rings in a condition of greatest axial displacement.

In an exemplary manner, the FIGS. 2 and 3 represent the ramp rings 19 and 21 rolled out into the plane of the drawing. The position A (FIG. 2) of the ramp rings in relation to each other corresponds to a minimum amount of axial displacement with small compressive forces, while the position A' (FIG. 3) corresponds to a maximum amount of axial displacement with large compressive forces. The roller elements 14' that serve to reduce frictional resistance are distributed evenly over the circumference of the ramp rings and held captive in a roller cage 24'. The ramp profiles 19a, 20a, which have complementary shapes, are rotationally displaced in relation to each other by the torque of the driving shaft 5 (see FIG. 1) and thereby axially displaced against the reactive contact force of the belt 11 (see FIG. 1) until the participating forces are in equilibrium. To optimize the amount of compressive force in relation to each amount of rotational displacement, the rise of the ramp profiles 19a, 21a is a non-linear function of the angle of displacement. The roller elements 14' are constrained by the roller cage 24' to prevent them from leaving their assigned locations. In addition, to prevent the entire roller cage 24' from becoming dislodged in the circumferential direction along the non-linear ramp geometry, the roller cage 24' is non-rotatably constrained at the hub flange as described in the context of FIG. 1.

Figure 4:
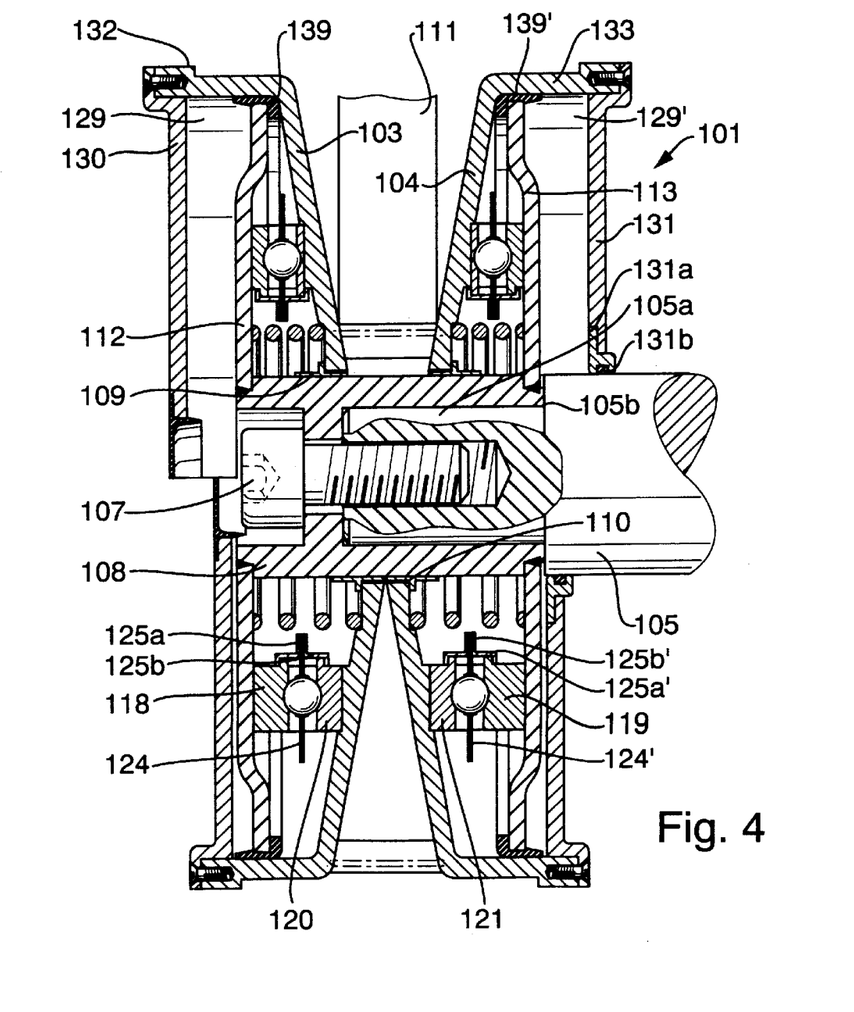
FIG. 4 represents an embodiment of a variator according to the invention with two disk-tightening devices shown in a lengthwise section.

FIG. 4 represents an embodiment of a variator 101 without a vibration absorber for rotational vibrations but otherwise similar to the variator 1 of FIG. 1, except for the differences as described below.

To reduce the number of different parts, the variator 101 has a largely symmetric configuration with regard to a plane of symmetry defined by the median line of the belt 111, which allows the use of pairs of equal parts except for the hub 108 that is centered on a projection 105a of the driving shaft 105 and screwed tight against a shoulder 105b of the driving shaft 105 by means of the screw 107 and further with the exception of the end flanges 130, 131 that are located axially opposite the conical disks 103, 104 and enclose the chambers 129, 129', the chamber 129' being sealed at the point where the end flange 131 meets the driving shaft 105 by means of an interposed ring 131a holding a ring seal 131b.

The conical disks 103, 104 are centered at their outer radius on the hub flanges 112, 113 with interposed slide bushings 139, 139'. At their inner circumference, the conical disks 103, 104 are sealed against the driving shaft 105 by means of sealing sleeves 109, 110. The ring walls 132, 133 are formed as integral, axially extending portions of the conical disks 103, 104. The roller cages 124, 124' are connected to holder rings 125a, 125b, 125a', 125b' engaged at the inner circumference of the ramp rings 118, 119, 120, 121 in an arrangement where the pairs of holder rings 125a, 125b and 125a', 125b' and an interposed internal flange of the respective roller cage 124, 124', respectively, are welded, riveted or screwed together.

Figure 5:
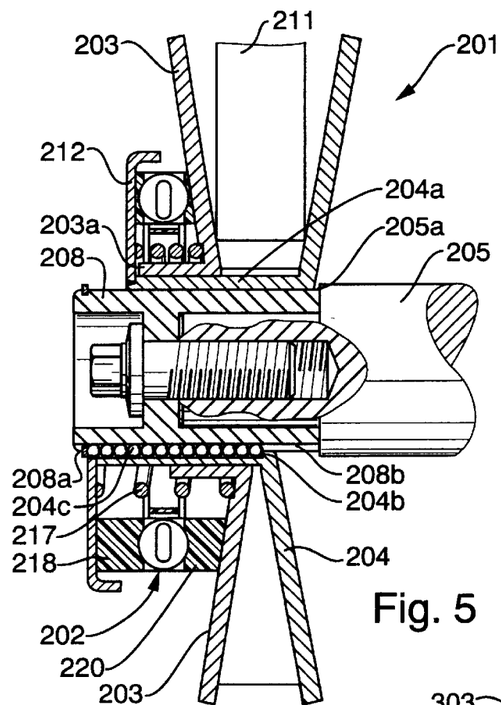
FIG. 5 represents an embodiment of a variator according to the invention with one disk-tightening device shown in a lengthwise section.

FIG. 5 represents a variator 201 according to the present invention that is different from the embodiment of FIG. 1. The conical disks 203, 204 are axially floating on the hub 208 between limit stops in the form of a retainer ring 208a and a shoulder 205a of the driving shaft 205, and the position of the conical disks 203, 204 on the hub 208 is governed by the position of the belt 211. The conical disk 204 that is closer to the driving shaft 205 has an axial, ring-shaped extension 204a. The ring-shaped extension 204a and the hub 208 have matching axial grooves 204b, 208b facing each other to form a channel holding roller elements 204c, thereby providing a non-rotatable but axially movable connection between the conical disk 204 and the hub 208. The conical disk 203 has an axial, ring-shaped extension 203a pointing in the opposite direction from the conical disk 204. The extension 203a is slidably seated on the extension 204a, providing an axially and rotationally non-constrained support for the conical disk 203. The hub flange is welded to the end surface of the axial extension 204a of the conical disk 204. The helical compression spring 217, taking up the innermost radial space available, rests axially between the extension 203a and the hub flange 212 and applies a torque-independent base amount of compressive force to the belt 211 through the two conical disks 203 and 204. Radially adjacent to the outside of the helical compression spring 217 is the disk-tightening device 202 with ramp rings 218 and 220 formed on the hub flange 212 and the conical disk 203. The conical disk 204 along with the hub flange 212, being non-rotatably seated on the hub 208, is rotated against the conical disk 203 by a torque-dependent amount. The torque-dependent rotation causes an axial displacement of the conical disk 203, thereby generating a torque-dependent contact pressure on the belt 211. Guided by the position of the belt 211, the conical disk 204 will float to the correct axial position on the hub 208 in accordance with the axial displacement of the pressure 27 generating device. When there is a decrease in the torque to be transmitted, the displacement of the ramp rings is reversed by the axial force between the belt 211 and the disks 203, 204 working against the force of the energy-storing elements until the contact pressure corresponds to the actual amount of friction required for the belt to drive the auxiliary devices.

Figure 6:
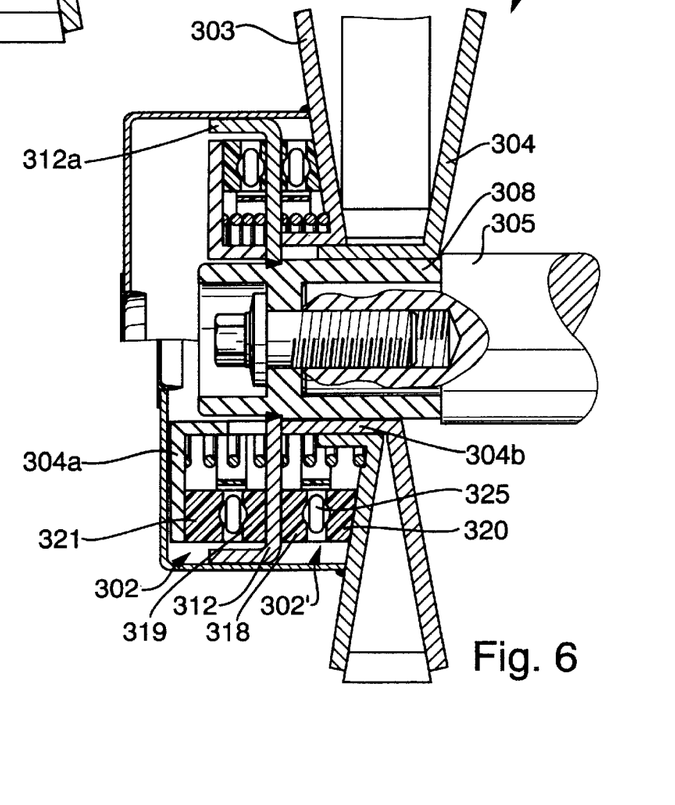
FIG. 6 represents an embodiment of a variator according to the invention with two axially adjacent disk-tightening devices shown in a lengthwise section.

In the embodiment of FIG. 6, a variator 301 comprises two conical disks 303, 304 supported in a floating position on the hub 308, with the conical disk 303 being seated on the conical disk 304. Two disk-tightening devices 302, 302' are arranged on the opposite side from the driving shaft 305 and are controlled by a single hub flange 312 that is non-rotatably connected to the hub 308. The axial displacement of the conical disk 303 is controlled directly by the ramp rings 318 and 320 arranged, respectively, on the hub flange 312 and the conical disk 303 with interposed roller elements 325. The axial displacement of the conical disk 304 is controlled by the ramp rings 319 and 321 arranged at the same radius as the ramp rings 318 and 320 on the hub flange 312 and on an auxiliary flange 304a with interposed roller elements 325'. The auxiliary flange 304a is connected to the conical disk 304 through a tubular connector flange 304b on which the conical disk 303 is supported. The connector flange 304b has openings 304c for radially inward-directed projections of the hub flange 312 by which the latter is connected to the hub 308. The openings 304c are appropriately dimensioned to leave a sufficient amount of play for the total range of rotational displacement of the ramp rings 318, 319, 320, 321 and for the axial displacement between the hub flange 312 and the conical disk 304 that occurs as a consequence of the rotational displacement. The housing 330 for the disk-tightening devices 302, 302' is solidly connected to the conical disk 303 as well as centered, axially movable and rotatable on a ring-like axially extending portion 312a of the hub flange 312.

Figure 7:
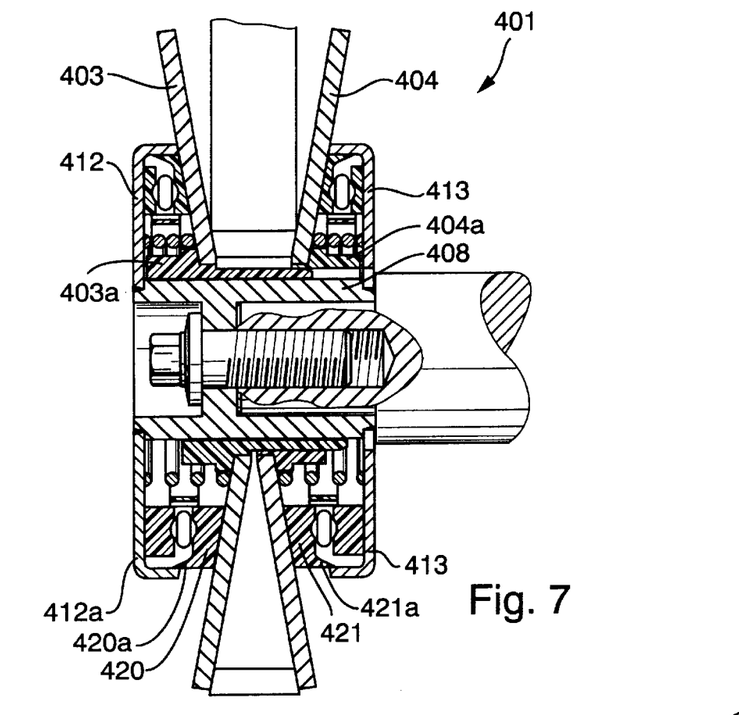
FIG. 7 represents an embodiment of a variator according to the invention with a floating hub and two disk-tightening devices shown in a lengthwise section.

The variator 401 of FIG. 7 has hub flanges 412, 413 welded to both ends of the hub 408. The two conical disks 403, 404 are arranged axially between the hub flanges 412, 413 on hubs 403a, 404a that are nested on each other and seated on the hub 408 so that the variator functions principally in the same manner as described in the context of FIG. 1. The conical disks 403, 404 are centered and/or sealed against the axially extending portions 412a, 413a of the hub flanges 412, 413 through axial projections 420a, 431a of the ramp rings 420, 421 which are formed on the conical disks 403, 404.

Figure 8:
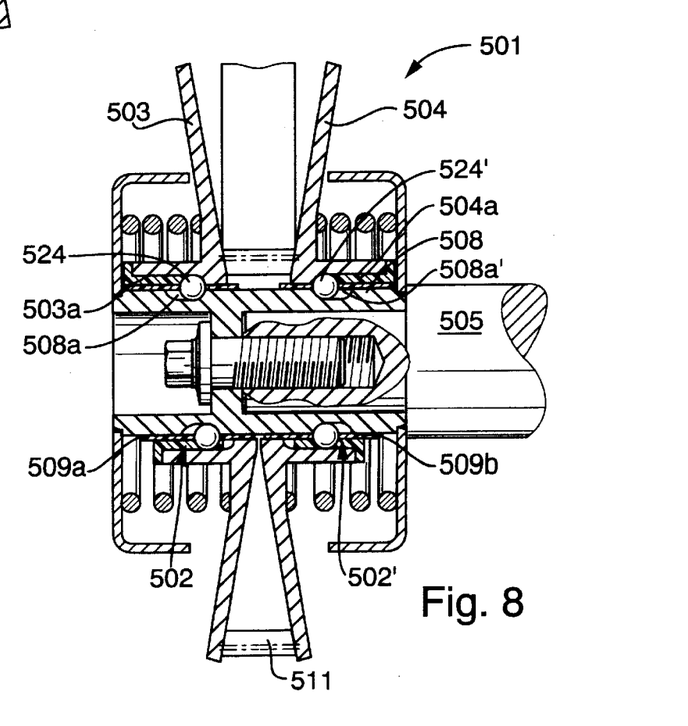
FIG. 8 represents a lengthwise section of an embodiment of a variator according to the invention with the disk-tightening device arranged radially inside the conical disks.
Figure 9A:
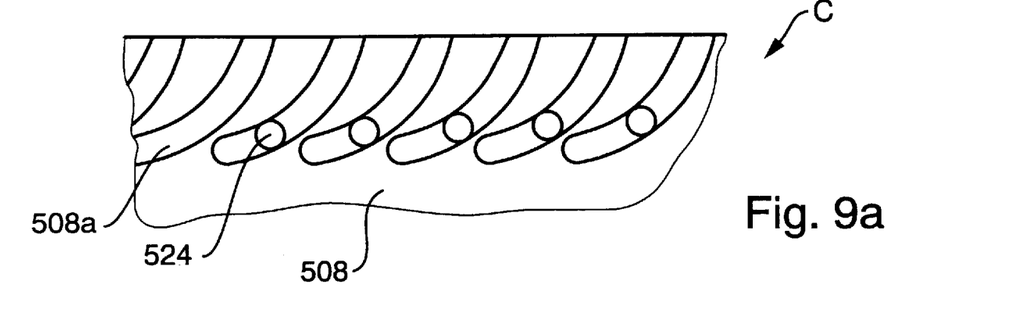
FIG. 9a represents a ramp geometry of the hub of the embodiment of FIG. 8 rolled out into the plane of the drawing.
Figure 9B:
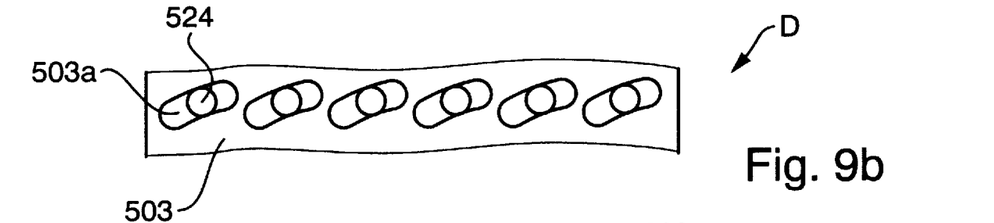
FIG. 9b represents a ramp geometry of the conical disk of the embodiment of FIG. 8 rolled out into the plane of the drawing.

The embodiment of a variator 501 (as illustrated in FIG. 8) has no ramp rings. The torque-dependent control of the contact pressure is produced by the two disk-tightening devices 502, 502' acting on the conical disks 503 and 504, respectively. The disk-tightening devices 502, 502' are of mirror-symmetric configuration, comprised of grooves 503a, 504a distributed over the internal circumference of the conical disks 503, 504, complementary grooves 508, 508' distributed over the circumference of the hub 508, and roller elements 524, 524' running in the grooves to transmit the torque. FIG. 9a illustrates an example C of a groove profile 508a (rolled out into the plane of the drawing). The profile 508a is complementary to the groove profile 503a shown as example D in FIG. 9b. The corresponding groove profiles 508a' and 504a run in the opposite direction, mirror-symmetric to 508a and 503a. The grooves 508a that are impressed on the hub 508 are arc-shaped along a path that advances both in the axial and circumferential direction, e.g., in the sense of a right-handed spiral in relation to the rotation of the shaft 505, in a complementary pattern with the grooves 503a. Seated in the grooves 508a, 508a', 503a, 504a are the roller elements 524, 524' to provide a form-fitting engagement. As the driving shaft 505 (FIG. 8) rotates against a reactive torque of the auxiliary devices, the hub 508 is forced to turn to a displaced position in relation to the conical disks 503, 504. Because the grooves 503a, 504a, 508a, 508a' have an axial component and the groove profiles 503a, 508a are mirror-symmetric to the profiles 504a, 508a', the turn of the hub against the conical disks 503, 504 causes the latter to move closer to each other on the hub 508. Thus, the torque-dependent contact pressure acts axially from both sides of the belt 511. Sliding bearings 509a, 509b with openings corresponding in shape to the grooves 503a, 504a, 508a, 508a' are provided radially between the conical disks 503, 504 and the hub 508. To simplify the manufacturing process, the grooves 508a, 508a' can be cut all the way out to the ends of the hub 508. In this case, the range of angular displacement is limited by the axial dimension of the grooves 503a, 504a when the roller elements 524 run against the ends of the grooves 503a, 504a.

Figure 10:
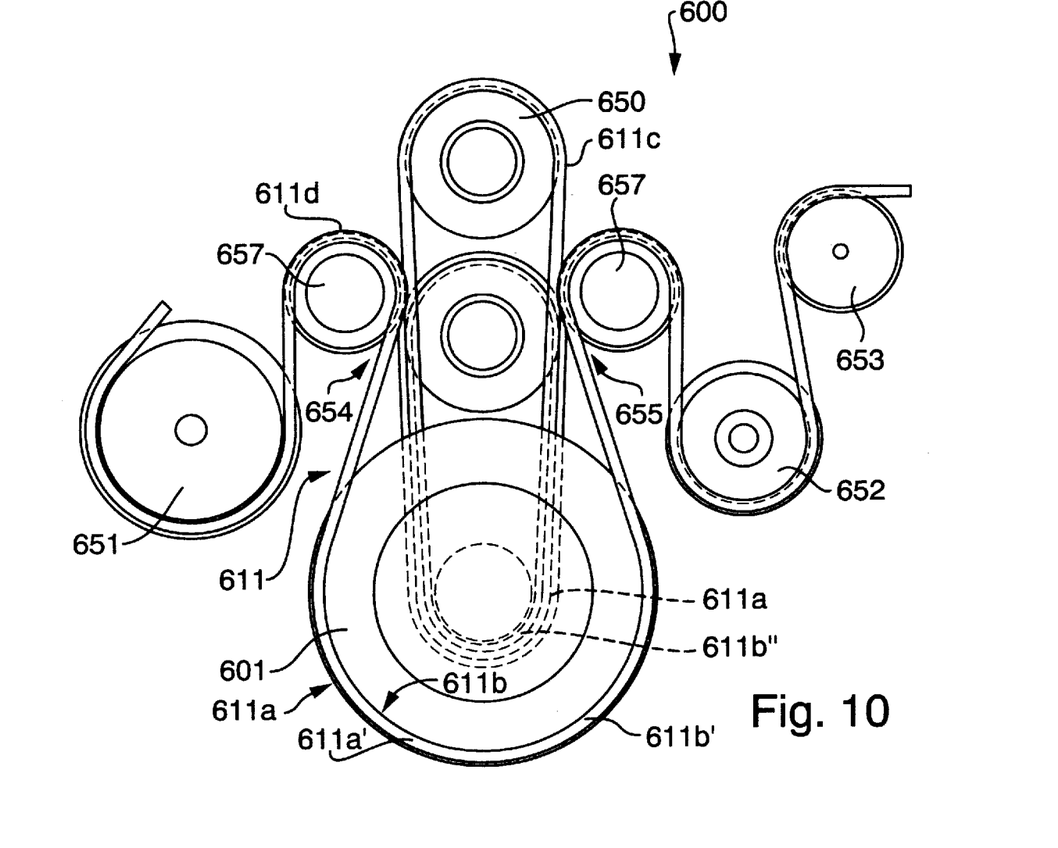
FIG. 10 represents a continuously variable belt-drive mechanism according to the invention.

FIG. 10 represents a partial view of an embodiment of a belt-drive mechanism 600 with a variator 601 according to the invention, comprising a belt 611 that is divided into a driving belt 611a and a transmission belt 611b. The geometry of the belt loop is illustrated for the two extremes of a large transmission ratio where the belts are shown as 611a', 611b' and a small transmission ratio where the belts run at a small radius and are shown as 611a" and 611b". The transmission ratio is set by moving the tensioning pulley 650 either manually or automatically (e.g., by means of an electric motor) in the radial direction of the variator 601 against the resistance of the contact forces acting on the transmission belt 611b, so that the transmission belt 611b, configured as a wide V-belt, changes its running radius at the variator 601.

Figure 11A:
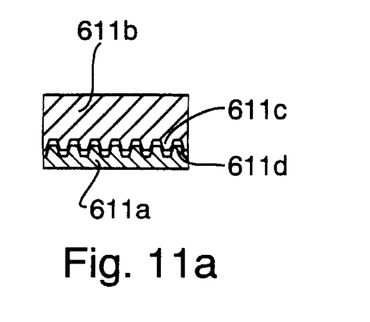
FIGS 11a and b represent the cross-sections of combinations of a transmission belt with a driving belt.
Figure 11B:
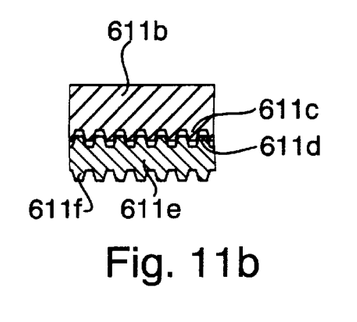

On the outside of its loop, the transmission belt 611b has multiple lengthwise V-grooves 611c that are frictionally engaged in a corresponding multiple-groove profile 611d on the inside of the loop of driving belt 611a. The multiple-groove profile 611d also serves to drive the auxiliary devices 651, 652, 653. FIGS. 11a and 11b show the cross-sections of two embodiments of driving belts 611a and 611e, respectively, that are frictionally engaged with the transmission belt 611b through the multiple-groove profiles 611c, 611d. The embodiment of a drive belt 611e in FIG. 11b has multiple-groove profiles 611d and 611f on both sides of the belt so that auxiliary devices can be driven on both sides of the drive belt in either a left-hand or right-hand sense of rotation.

FIG. 10 further shows two guide pulleys 656, 657 adjacent to the areas 654, 655 where the belts 611a and 611b separate from each other. Alternatively, the driving pulleys of one or two auxiliary devices could perform the function of guide pulleys. Also along the belt loop but outside of the illustrated portion is a tensioning pulley to adjust the tension in the driving belt 611a when its running radius around the variator changes.

Figure 12:
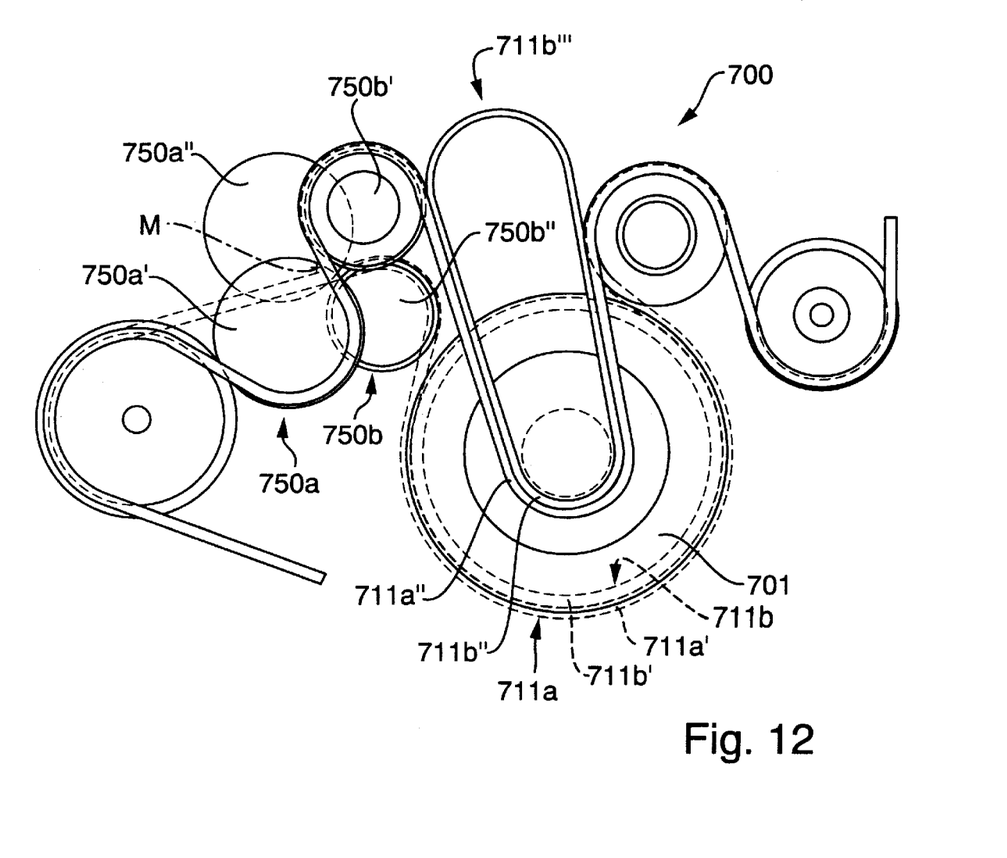
FIG. 12 represents a view of the belt in the plane of the belt loop.

An alternative arrangement is used in the belt drive 700 of FIG. 12, where the radii 711b', 711b' at which the transmission belt 711b runs around the variator 701 are controlled without applying tension to the transmission belt 711b itself. The running radius is determined by a tensioning device 750 in the loop of the driving belt 711a. The tensioning device consists of two direction-changing guide pulleys 750a, 750b that swivel together about a common center of rotation M.

The two extreme positions are indicated as 750*a*', 750*b*' and 750*a*", 750*b*". In the position 750*a*', 750*b*', the loop of the driving belt 711*a* is contracted whereby the transmission belt 711*b* is pulled into a smaller running radius around the variator as indicated by the belt positions 711*a*", 711*b*". In this condition, the transmission loop is pulled outside the circumference of the variator 701 and loops around an arc 711*b*" beyond the area where it is guided by the guide pulleys 757 and 750*b* (the latter being in position 750*b*'). As the pair of guide pulleys 750*a*, 750*b* is swiveled about point M, the tension in the driving belt 711*a* is relaxed, and because of the contact pressure exerted on the transmission belt 711*b* by the disks of the variator 701 the transmission belt 711*b*, and along with it the drive belt 711*a*, is pushed into the position 711*a*', 711*b*', i.e., to a large running radius approximately equal to the conical disk diameter of the variator 701 and corresponding to a commensurately large transmission ratio. The swiveling of the guide pulleys 715*a*, 750*b* about their common center of rotation M can be effected manually or automatically.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A continuously variable belt-drive mechanism with
   a variator having at least two conical disks arranged concentrically on a driving shaft and receiving a torque from a prime mover unit, at least one of the conical disks being axially movable on the driving shaft,
   a belt running at a variable running radius axially between the conical disks,
   at least one disk-tightening device pushing the axially movable conical disk against the other of the two conical disks and thereby effecting a frictional engagement between the conical disks and the belt, the frictional engagement enabling the belt to transmit the torque to at least one additional pulley of the belt-drive mechanism,
   comprising the improvement that the disk-tightening device includes first and second guiding means in a cooperative arrangement where the first guiding means is solidly connected to the at least one axially moveable conical disk, the second guiding means is axially fixed on the driving shaft, the torque produces a relative rotational displacement between the first and second guiding means, and the relative rotational displacement produces an axial displacement of the axially movable conical disk.

2. A continuously variable belt-drive mechanism with
   a variator having at least two conical disks seated concentrically on a driving shaft and receiving a torque from a prime mover unit, at least one of the conical disks being axially movable on the driving shaft,
   a belt running at a variable running radius axially between the conical disks,
   at least one disk-tightening device pushing the axially movable conical disk against the other of the two conical disks and thereby effecting a frictional engagement between the conical disks and the belt, the frictional engagement enabling the belt to transmit the torque to at least one additional pulley of the belt-drive mechanism,
   comprising the improvement that the disk-tightening device includes first and second guiding means in a cooperative arrangement where the first guiding means is solidly connected to the at least one axially moveable conical disk, the second guiding means is axially fixed on the driving shaft, an external transmission-ratio control means produces a relative rotational displacement between the first and second guiding means, and the relative rotational displacement produces an axial displacement of the axially movable conical disk.

3. The continuously variable belt-drive mechanism of either claim 1 or claim 2, wherein the first guiding means comprises at least three evenly distributed axially rising ramps arranged along a circumference of the axially movable conical disk and the second guiding means comprises at least three evenly distributed axially rising complementary ramps arranged along a circumference of a ramp-supporting component that is axially fixed on the driving shaft.

4. The continuously variable belt-drive mechanism of either claim 1 or claim 2, wherein the first guiding means comprises a first set of evenly distributed grooves arranged along an internal circumference of the axially movable conical disk and the second guiding means comprises a second set of evenly distributed grooves arranged along an external circumference of a hub that is axially fixed on the driving shaft, the first and second set of grooves being of complementary configuration, running along spiral segments advancing both in an axial and a circumferential direction, and wherein further the tightening means comprises roller elements being guided in the grooves.

5. The continuously variable belt-drive mechanism of either claim 1 or claim 2, wherein the prime mover unit is an internal combustion engine and wherein further at least one auxiliary device is driven by the at least one additional pulley of the belt-drive mechanism.

6. The continuously variable belt-drive mechanism of either claim 1 or claim 2, wherein the prime mover unit is an internal combustion engine and wherein further the belt transmits the torque to a second variator running at a second variable running radius, the running radius and the second running radius varying in a complementary manner in relation to each other, so that the variator, the second variator and the belt work together as a continuously variable transmission.

7. The continuously variable belt-drive mechanism of claim 3, wherein the conical disks are seated on a hub that is centered on and non-rotatably connected to the driving shaft.

8. The continuously variable belt-drive mechanism of claim 7, wherein the ramp-supporting component that carries the complementary ramps is a hub flange attached to the hub through an axially fixed and non-rotatable connection.

9. The continuously variable belt-drive mechanism of either claim 1 or claim 2, wherein the belt is received in a space of radially increasing axial width between conical surfaces of the conical disks, each conical surface sloping at an angle $\alpha$ in a range of $5° < \alpha < 20°$ against a plane that is perpendicular to the driving shaft.

10. The continuously variable belt-drive mechanism of claim 8, further comprising an axially movable chamber enclosing the disk-tightening device and the hub flange, the chamber being delimited by the-at least one axially movable conical disk, an axially directed tubular flange extending from the axially movable conical disk towards the outside of the variator, and an internal flange extending radially inward from an outer end of the tubular flange, the chamber being divided into two compartments by the hub flange.

11. The continuously variable belt-drive mechanism of claim 10, wherein the internal flange is centered, rotatable and axially movable on the hub.

12. The continuously variable belt-drive mechanism of claim 10, wherein the chamber is at least partially filled with a lubricant to lubricate the disk-tightening device.

13. The continuously variable belt-drive mechanism of claim 12, wherein the hub flange has at least one opening to allow an exchange of the lubricant between the two compartments.

14. The continuously variable belt-drive mechanism of claim 10, wherein the internal flange has a central opening to allow the hub to be mounted on the driving shaft and wherein further the opening can be closed with a protective cap.

15. The continuously variable belt-drive mechanism of claim 10, wherein the hub flange is slidably guided at an outside circumference of the chamber, allowing both axial movement and rotation of the hub flange in relation to the chamber.

16. The continuously variable belt-drive mechanism of claim 3, wherein the axially movable disk has a radial support and an axial support that are spatially separated from each other.

17. The continuously variable belt-drive mechanism of claim 16, wherein the radial support is provided at an exterior circumference of the axially movable disk and the axial support is provided at the radial location of the disk-tightening device.

18. The continuously variable belt-drive mechanism of claim 17, wherein the axial support is provided by elements belonging to the disk-tightening device.

19. The continuously variable belt-drive mechanism of claim 18, wherein the elements belonging to the disk-tightening device are the complementary ramps.

20. The continuously variable belt-drive mechanism of either claim 1 or claim 2, wherein an axial displacement away from each other of the two conical disks occurs against an opposing force generated by an energy-storing device interposed between the at least one axially movable conical disk and a hub flange attached to the hub through an axially fixed and non-rotatable connection.

21. The continuously variable belt-drive mechanism of claim 20, wherein the energy-storing device generates a torque-independent minimum amount of the opposing force corresponding to a minimum amount of tension in the endless flexible torque-transmitting element.

22. The continuously variable belt-drive mechanism of claim 20, wherein the energy-storing device is a spring selected from the category that consists of helical compression springs and plate springs.

23. The continuously variable belt-drive mechanism of claim 8, wherein the ramps are formed on a first ramp ring that is connected to the at least one axially movable conical disk and the complementary ramps are formed on a second ramp ring that is connected to the at least one hub flange.

24. The continuously variable belt-drive mechanism of claim 23, comprising two hub flanges arranged on the hub at an axial distance with second ramp rings facing towards each other and two movable conical disks slidably centered on the hub between the two hub flanges with first ramp rings facing towards the respectively adjacent second ramp rings.

25. The continuously variable belt-drive mechanism of claim 23, wherein the first and second ramp rings have a median radius smaller than half of a radius of the axially movable conical disk.

26. The continuously variable belt-drive mechanism of claim 23, wherein the first ramp ring is formed integrally of one piece with the axially movable conical disk and the second ramp ring is formed integrally of one piece with the hub flange.

27. The continuously variable belt-drive mechanism of claim 23, wherein the first and second ramp rings are made of a material from the group consisting of metals and polymers.

28. The continuously variable belt-drive mechanism of claim 23, wherein roller elements are axially interposed between the ramps and the complementary ramps.

29. The continuously variable belt-drive mechanism of claim 28, wherein the roller elements are balls held captive in a ring-shaped ball cage.

30. The continuously variable belt-drive mechanism of claim 29, wherein the ball cage is connected to a holder ring that has tongue-like projections distributed along a circumference and wherein further the hub flange has openings corresponding to the tongue-like projections so that the holder ring can be installed non-rotatably and securely by engaging the tongue-like projections in the openings.

31. The continuously variable belt-drive mechanism of claim 28, wherein the at least one hub flange and the at least one axially movable conical disk rest axially against each other on the roller elements.

32. The continuously variable belt-drive mechanism of either claim 1 or claim 2, wherein the first and second guiding means have profiles that cause the axial displacement to be in linear proportion to the relative rotational displacement.

33. The continuously variable belt-drive mechanism of either claim 1 or claim 2, wherein the first and second guiding means have profiles that cause the axial displacement to be in a non-linear relationship to the relative rotational displacement.

34. The continuously variable belt-drive mechanism of claim 31, wherein the roller elements are constrained to a controlled amount of displacement in relation to the relative rotational displacement.

35. The continuously variable belt-drive mechanism of claim 34, wherein the controlled amount of displacement occurs as a result of pinion gears arranged in the ball cage and wherein further the pinion gears roll on toothed profiles provided on at least one of the hub flange and the axially movable conical disk.

36. The continuously variable belt-drive mechanism of claim 7, wherein the at least one axially movable disk is seated rotatably on the hub.

37. The continuously variable belt-drive mechanism of claim 7, wherein each of two axially movable conical disks is rotatably seated on the hub with an interposed slide bushing.

38. The continuously variable belt-drive mechanism of claim 7, wherein a first axially movable conical disk is seated on the hub with an interposed first bushing and a second axially movable conical disk is seated on a second bushing in an arrangement where the second bushing is seated axially movable on the first bushing.

39. The continuously variable belt-drive mechanism of claim 23, wherein
   a single hub flange has two second ramp rings, one on each side, each of the second ramp rings cooperating as a disk-tightening device with a respective first ramp ring of a first axially movable conical disk and a second axially movable conical disk,
   both the first and second axially movable conical disk are located axially on the same side of the hub flange,
   the first conical disk is adjacent to the hub flange and seated axially movable on a tubular connector flange that is solidly attached to the second conical disk, the tubular connector flange extends to an opposite end beyond the hub flange, and a radially extending auxiliary flange is attached to the opposite end and holds the first ramp ring of the second axially movable conical disk.

40. The continuously variable belt-drive mechanism of claim 39, wherein the single hub flange is arranged in one of two spaces consisting of the space between the conical disks and the prime mover unit and the space on an opposite side of the conical disks in relation to the prime mover unit.

41. The continuously variable belt-drive mechanism of claim 31 wherein the ramps are provided with a friction-reducing surface layer.

42. The continuously variable belt-drive mechanism of claim 8, wherein the variator is provided with a vibration absorber for rotational vibrations comprising an absorber flange attached to the hub, an absorber mass that is rotatable in relation to the absorber flange, and an energy-storing device interposed between the absorber mass and the absorber flange to generate an opposing circumferentially directed force against the absorber mass rotating in relation to the absorber flange.

43. The continuously variable belt-drive mechanism of claim 42, wherein the vibration absorber is accommodated in a space at an outer circumference of the hub flange.

44. The continuously variable belt-drive mechanism of claim 43, wherein the hub flange simultaneously serves as the absorber flange, the absorber mass is configured as two mutually connected mass rings adjoining the hub flange axially on both sides, and the energy-storing device is confined between and acts against radial projections of the hub flange and corresponding openings in the mass rings.

45. The continuously variable belt-drive mechanism of either claim 1 or claim 2, wherein the running radius is set by adjusting an effective length of the belt that is available for the path of the belt around the variator.

46. The continuously variable belt-drive mechanism of claim 45, wherein the effective length is controlled by at least one tensioning pulley that is movable in a radial direction in relation to the variator.

47. The continuously variable belt-drive mechanism of claim 46, comprising an electric motor to move the tensioning pulley.

48. The continuously variable belt-drive mechanism of claim 47, wherein the electric motor is self-holding.

49. The continuously variable belt-drive mechanism of claim 47, wherein a group of power-transmitting pulleys consists of the variator and all pulleys receiving torque from the belt and wherein further the electric motor is controlled dependent on a rate of rotation of at least one power-transmitting pulley.

50. The continuously variable belt-drive mechanism of claim 49, wherein at least one tachometer is arranged at the at least one power-transmitting pulley.

51. The continuously variable belt-drive mechanism of either claim 1 or claim 2, wherein the belt is divided into a transmission belt that controls the running radius and a driving belt that transmits the torque to the at least one additional pulley of the belt-drive mechanism.

52. The continuously variable belt-drive mechanism of claim 51, wherein the transmission belt and the driving belt are in form-fitting engagement through a surface profile by which the transmission belt drives the driving belt.

53. The continuously variable belt-drive mechanism of claim 52, wherein the transmission belt runs in a loop that has an outside and an inside and the surface profile is provided on the outside.

54. The continuously variable belt-drive mechanism of claim 52, wherein the driving belt transmits the torque to the at least one additional pulley of the belt-drive mechanism through the profile.

55. The continuously variable belt-drive mechanism of claim 1, wherein the profile is a multiple V-profile with V-grooves running lengthwise on the belt.

56. The continuously variable belt-drive mechanism of claim 55, wherein the multiple V-profile is provided on two sides of the driving belt, one side performing the form-fitting engagement to the transmission belt and an opposite side transmitting the torque to the at least one additional pulley of the belt-drive mechanism.

57. The continuously variable belt-drive mechanism of claim 55, wherein the multiple V-profile that is provided on two sides of the driving belt serves to transmit the torque to additional pulleys driving auxiliary devices that run in both a left- and a right-handed sense of rotation.

58. The continuously variable belt-drive mechanism of claim 51, wherein the driving belt is held in tension by at least one tensioning pulley.

59. The continuously variable belt-drive mechanism of claim 51, wherein the transmission belt has a diameter corresponding approximately to a diameter of the conical disks.

60. The continuously variable belt-drive mechanism of claim 51, wherein a transmission-ratio changing device acts directly on the transmission belt in an arrangement where an effective length of the driving belt is adjusted by belt-tensioning means.

61. The continuously variable belt-drive mechanism of claim 60, wherein the tensioning means is a guide pulley that is movable along a radius of the variator.

62. The continuously variable belt-drive mechanism of claim 51, wherein a transmission-ratio changing device acts directly on the driving belt in an arrangement where an effective length of the driving belt is set by the transmission-ratio changing device and the transmission belt adjusts itself by forming a variable loop from a point where the driving belt leaves the form-fitting engagement to a point where the driving belt resumes the form-fitting engagement with the transmission belt.

63. The continuously variable belt-drive mechanism of claim 62, wherein track-holding guide means are arranged at the respective points where the driving belt and the transmission belt leave and resume their form-fitting engagement.

64. The continuously variable belt-drive mechanism of claim 63, wherein the track-holding guide means are pulleys from the category that consists of direction-changing guide pulleys, driven pulleys of auxiliary devices, and tensioning pulleys.

65. The continuously variable belt-drive mechanism of claim 2, wherein the profile is a multiple V-profile with V-grooves running lengthwise on the belt.

* * * * *